K. GORLACH.
FISHING TACKLE.
APPLICATION FILED JAN. 21, 1921.

1,379,402.                                   Patented May 24, 1921.

Inventor
Karol Gorlach
By his Attorney
George C. Hemicke

UNITED STATES PATENT OFFICE.

KAROL GORLACH, OF NEW YORK, N. Y.

FISHING-TACKLE.

1,379,402. Specification of Letters Patent. Patented May 24, 1921.

Application filed January 21, 1921. Serial No. 438,867.

*To all whom it may concern:*

Be it known that I, KAROL GORLACH, a citizen of Poland, residing at Bronx, county of Bronx, and State of New York, have invented certain new and useful improvements in Fishing-Tackle, of which the following is a specification.

This invention relates to improvements in fishing tackle, particularly tackle for catching deep-sea fish.

The invention has for its principal object to provide a novel and inexpensive tackle of this type to enable fishermen to positively hold and take in the fish swallowing the bait.

Another object of the invention is the provision of an apparatus of this character which will facilitate the landing of a fish and which can be carried along on the person without inconvenience.

For further comprehension of the invention, and of the objects and advantages thereof, reference will be had to the following description and accompanying drawing, and to the appended claims in which the various novel features of the invention are more particularly set forth.

In the drawing—

Figure 1:
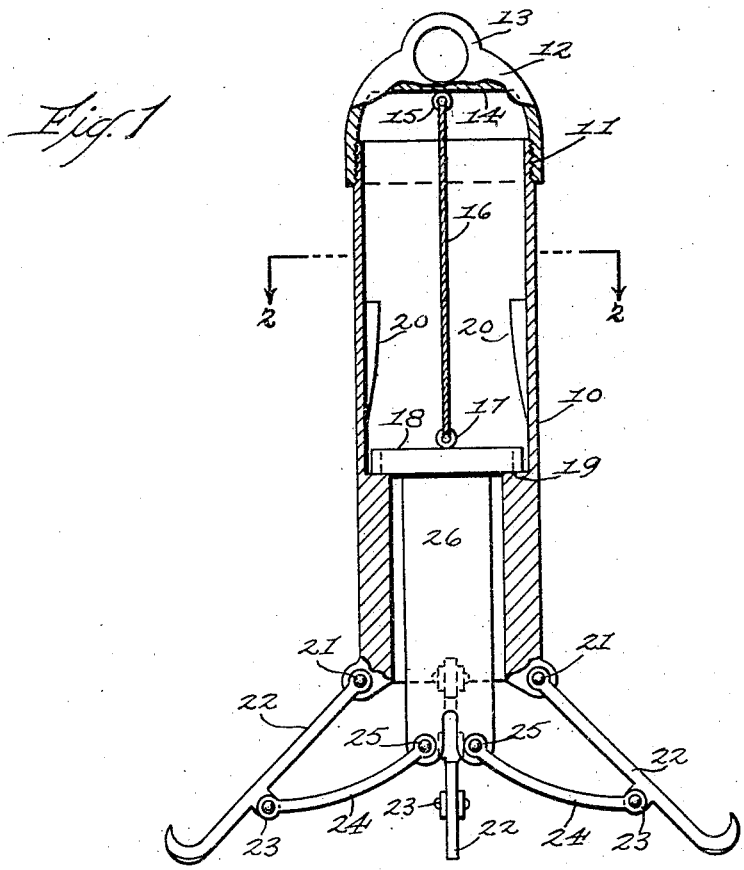
Figure 1 is a side elevation of my improved device, partly in longitudinal section.
Figure 2:
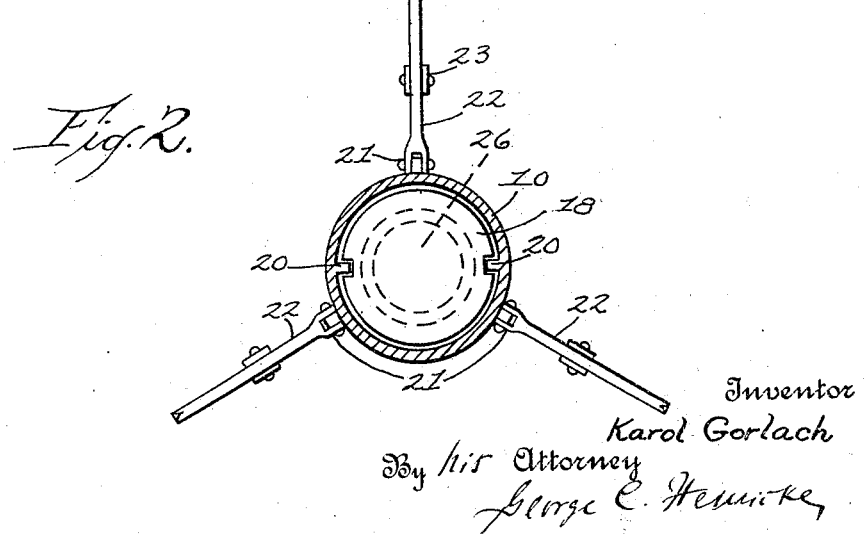
Fig. 2 is a transverse section through the device along line 2—2 of Fig. 1.

A hollow, cylindrical metal sleeve 10 is provided at its upper end with external screw threads 11 adapted to be engaged by the inner screw threaded wall of a cap 12 having a ring 13 at its extreme upper end for engagement by a cable or the like. Within the cap a transverse rod 14 is located having in approximately its center an eye 15 in which one end of a cable 16 is guided, the other end of which is passed through an eye 17 of a head 18, adapted to engage with its lower face a shoulder 19 within the sleeve 10.

Two guide elements 20 are provided at the inner walls of the sleeve 10 on opposite sides thereof.

To the lower end of the sleeve 10 are pivotally secured as at 21, three bent hooks 22, provided intermediate their ends with projections 23 to which the ends of links 24 are pivotally secured, the free ends of which are pivotally attached, as at 25 to the lower end of the member 26, to the upper end of which the head 18 is secured.

In operation, the cap 12 is unscrewed from the sleeve 10 and the member 26 is drawn into the sleeve 10 by the cable 16, the upward movement of which will carry the links 24 along, drawing the hooks 22 together allowing a piece of meat or any other suitable bait which has been correspondingly slit to be attached to the hook-ends.

The slackened cable 16 will be held on top of the head 18 within the cap 12, and the head and member 26 will be frictionally held within the sleeve, until a fish or other animal swallowing the bait and exerting a pull on the hooks will cause the hooks to spread and securely hold it. The outward movement of the member 26 is limited by the engagement of its head 18 with the shoulder 19.

It will be clear that changes may be made in the general arrangement of my device and in the construction of the minor details thereof, without deviating from the scope and spirit of my invention.

Having thus described my invention, what I claim as new and desire to secure by Letters Patent of the United States, is—

1. A device of the character described comprising a hollow sleeve, a headed element movably secured in said sleeve, guide elements within said sleeve normally holding said headed elements frictionally within said sleeve, hooks pivotally secured to said sleeve, links pivotally secured to said hooks and said headed element, and means for allowing a withdrawal of said element from said sleeve by an animal swallowing said hooks to spread the same in the mouth of the animal.

2. A device of the character described, comprising a hollow sleeve, a screw cap on said sleeve, a ring on said cap for the attachment of a cable, a shoulder in said sleeve, a headed element movably suspended in said sleeve adapted to be frictionally held within the same in its normal position, a plurality of spreading bait hooks pivotally secured to the lower end of said sleeve and links connecting said hooks to said headed element adapted to draw said hooks together when said headed element is frictionally held within said sleeve, and to spread the same asunder within the mouth of an animal swallowing the bait, and exerting a pull on said hooks.

3. A device of the character described comprising a hollow sleeve, a screw cap on said sleeve, a transverse rod in said cap, a headed body in said sleeve, a cable connecting said rod and the heads of said body, guide wings in said sleeve for frictionally holding said body in said sleeve, a shoulder in said sleeve, a plurality of bait hooks pivotally secured to the lower end of said sleeve, projections on said hooks, links pivotally secured to said projections and to the lower end of said headed body, allowing a normal folding of said hooks upon the frictional engagement of said body within said sleeve and a spreading of the hooks under the pull of an animal caught on said hooks, the head of said body engaging the shoulder in said sleeve for limiting the outward movement of said body.

In testimony whereof I have affixed my signature.

KAROL GORLACH.